(No Model.)
F. G. ECHOLS.
OIL INDICATOR FOR LAMP RESERVOIRS.
No. 531,106. Patented Dec. 18, 1894.
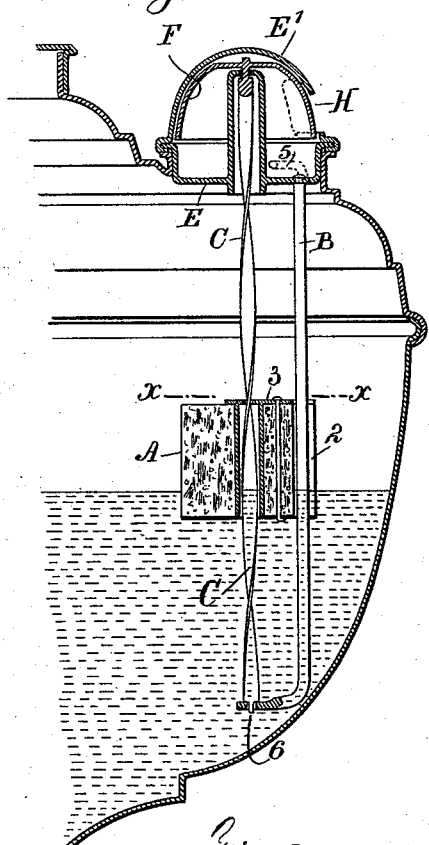
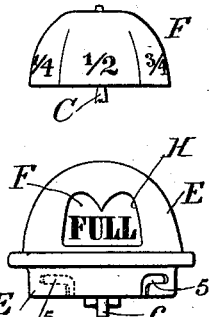
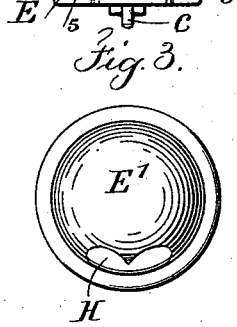
Witnesses
Chas. H. Smith
J. Staib
Inventor
Frank G. Echols
by Lemuel W. Serrell
Atty.

United States Patent Office.

FRANK G. ECHOLS, OF WATERBURY, CONNECTICUT, ASSIGNOR TO THE PLUME & ATWOOD MANUFACTURING COMPANY, OF SAME PLACE.

OIL-INDICATOR FOR LAMP-RESERVOIRS.

SPECIFICATION forming part of Letters Patent No. 531,106, dated December 18, 1894.

Application filed October 8, 1894. Serial No. 525,199. (No model.)

*To all whom it may concern:*

Be it known that I, FRANK G. ECHOLS, a citizen of the United States, residing at Waterbury, in the county of New Haven and State of Connecticut, have invented an Improvement in Oil-Indicators for Lamp-Reservoirs, of which the following is a specification.

In lamp reservoirs, especially those of a large size that are suspended, difficulty has heretofore been experienced in ascertaining when the supply of oil is nearly exhausted and also in properly filling the reservoir without the risk of the oil overflowing. Floats have heretofore been fitted upon a twisted rod and guided as the float rises and falls according to the level of the liquid, and by the movement of the float the twisted rod has been turned to indicate the condition of the oil or other liquid in the vessel.

The present improvement relates to the features of construction and combination hereinafter set forth, whereby a float and twisted rod are specially adapted to indicate the level of the oil in a lamp.

In the drawings, Figure 1 is a vertical section illustrating the improvement and showing a portion of the lamp reservoir. Fig. 2 is a sectional plan below the line x x. Fig. 3 is a plan view of the cap. Fig. 4 is an elevation of the indicating head that is fastened to the twisted rod. Fig. 5 is an elevation of the upper portion of the indicator.

The float A may be of cork or other suitable material and it is provided with a notch 2 at one side, a guide plate 3 secured upon the top of the float and notched at one edge for the guide wire B and having an elongated hole through the guide plate for the twisted rod C; and it is advantageous to introduce a metallic tube through the cork float to insure freedom in the movement of the float upon the twisted rod as such float rises or falls according to the level of the liquid in the lamp reservoir D. In the top of this lamp reservoir there is a suitable opening for the reception of the cap E which advantageously is secured by pins and bayonet slots 5, and to this cap E the guide wire B is permanently fastened at its upper end, and at the lower end the guide wire B is bent to form a step for the pivot 6 at the lower end of the twisted rod C, so that such rod is properly supported but free to be rotated by the action of the float A and guide plate 3 as such float rises or falls. The twisted rod C passes freely through a central opening in the cap E and receives at its upper end the indicating dome F, which indicating dome is within the outer dome E' that is secured at its lower edge to the cap E, which outer dome E' has a suitable opening at H through which the marks upon the indicating dome F are visible, and the upper end of the twisted rod C is pivoted within the outer dome E' or to a tube connected to the cap E as shown, and the parts turn freely.

Upon the exterior of the indicating dome F suitable words or numbers are provided, such for instance as "Full," "Empty," "$\frac{1}{4},\frac{1}{2}$, $\frac{3}{4}$," so as to indicate the condition of the oil in the reservoir according to the height of the float A, and the parts being free to turn by the action of the float the condition of the oil is always apparent by examining the indicating dome through the opening in the exterior dome, and hence oil can be supplied when the reservoir is empty or nearly so, and during the filling operation the height of the oil is indicated by the rotation of the indicating dome.

I claim as my invention—

1. The combination with a lamp reservoir having an opening in its upper part, of a cap fitting such opening and means for securing the cap in position, a guide wire connected with the cap and extending down into the reservoir, a central twisted rod or strip pivoted at its lower end in the guide wire, a float through which the twisted rod passes and having a notch or opening for the guide wire, and an indicating dome upon the top of the twisted wire and containing marks to denote the height of the oil in the reservoir, substantially as set forth.

2. The combination with a lamp reservoir having an opening in its upper part, of a cap removably connected with the reservoir at the opening, a guide wire descending from the cap into the reservoir, a twisted strip pivoted upon a step at the lower end of the guide wire, a float having a guide through which the twisted rod passes, and a notch to receive the guide wire, a pivot at the upper end of the twisted rod, an outer dome connected with the cap and having an opening, and an inner dome connected with the twisted rod and having indicating marks thereon visible through the opening in the outer dome, substantially as set forth.

Signed by me this 1st day of October, 1894.

F. G. ECHOLS.

Witnesses:
J. H. HURLBUT,
S. J. ATWOOD.